US 9,391,879 B2

(12) United States Patent
Kamboh

(10) Patent No.: US 9,391,879 B2
(45) Date of Patent: Jul. 12, 2016

(54) MIXED MEDIA CALL ROUTING

(71) Applicant: Airbus DS Communications, Inc., Temecula, CA (US)

(72) Inventor: Ameel Kamboh, Murrieta, CA (US)

(73) Assignee: Airbus DS Communications, Inc., Temecula, CA (US)

( * ) Notice: Subject to any disclaimer, the term of this patent is extended or adjusted under 35 U.S.C. 154(b) by 236 days.

(21) Appl. No.: 14/037,167

(22) Filed: Sep. 25, 2013

(65) Prior Publication Data
US 2015/0085858 A1    Mar. 26, 2015

(51) Int. Cl.
| | |
|---|---|
| *H04L 12/725* | (2013.01) |
| *H04L 29/06* | (2006.01) |
| *H04W 4/22* | (2009.01) |
| *H04M 3/51* | (2006.01) |
| *H04M 3/523* | (2006.01) |
| *H04W 4/02* | (2009.01) |
| *H04M 7/00* | (2006.01) |

(52) U.S. Cl.
CPC .......... *H04L 45/3065* (2013.01); *H04L 65/103* (2013.01); *H04L 65/105* (2013.01); *H04L 65/1006* (2013.01); *H04L 65/1069* (2013.01); *H04L 65/4015* (2013.01); *H04M 3/5116* (2013.01); *H04M 3/5235* (2013.01); *H04W 4/22* (2013.01); *H04M 7/006* (2013.01); *H04M 2203/2066* (2013.01); *H04W 4/02* (2013.01)

(58) Field of Classification Search
CPC .................................................. H04L 45/3065
See application file for complete search history.

(56) References Cited

U.S. PATENT DOCUMENTS

| | | | |
|---|---|---|---|
| 2,292,222 | A | 8/1942 | Haigis |
| 5,646,987 | A | 7/1997 | Gerber et al. |
| 6,091,808 | A | 7/2000 | Wood et al. |
| 6,208,986 | B1 | 3/2001 | Schneck et al. |
| 6,600,812 | B1 | 7/2003 | Gentillin et al. |
| 6,609,213 | B1 | 8/2003 | Nguyen et al. |
| 6,671,350 | B1 | 12/2003 | Oxley |

(Continued)

FOREIGN PATENT DOCUMENTS

CN    102 611 809    7/2012

OTHER PUBLICATIONS

International Search Report for International Application No. PCT/US2015/014679 dated May 18, 2015.

(Continued)

*Primary Examiner* — Charles C Jiang
*Assistant Examiner* — Thad Defauw
(74) *Attorney, Agent, or Firm* — Knobbe Martens Olson & Bear LLP

(57) ABSTRACT

In one aspect, a method of mixed media communication is provided. The method includes initializing, via an electronic device, a session associated with a sender device, the session including data of a first media type; determining a destination for the data of a first media type, the determination based on the first media type and available destination information; providing the data of the first media type to the determined destination; receiving data of a second media type for the session with the sender device; determining a second destination for the data of the second media type, the determination based on the second media type and the available destination information; and providing the data of the second media type to the second destination. A device and computer-readable medium for mixed media communication are also described.

20 Claims, 6 Drawing Sheets

(56) References Cited

U.S. PATENT DOCUMENTS

| | | | |
|---|---|---|---|
| 6,801,129 | B2 | 10/2004 | Grimm |
| 7,194,249 | B2 | 3/2007 | Phillips et al. |
| 7,251,312 | B2 | 7/2007 | D'evelyn et al. |
| 7,545,263 | B2 | 6/2009 | Plocher et al. |
| 7,646,854 | B2 | 1/2010 | Anderson |
| 7,701,363 | B1 | 4/2010 | Zlojutro |
| 7,705,775 | B2 | 4/2010 | Madhavan et al. |
| 7,813,335 | B2 | 10/2010 | Terpstra et al. |
| 8,638,907 | B1 * | 1/2014 | Schumacher .......... H04W 4/22 379/45 |
| 8,848,877 | B2 | 9/2014 | Seidberg et al. |
| 2002/0103622 | A1 | 8/2002 | Burge |
| 2002/0118796 | A1 | 8/2002 | Menard et al. |
| 2003/0028536 | A1 | 2/2003 | Singh |
| 2004/0049573 | A1 | 3/2004 | Olmstead et al. |
| 2005/0147088 | A1 | 7/2005 | Bao et al. |
| 2005/0157707 | A1 | 7/2005 | Sternagle |
| 2005/0203892 | A1 | 9/2005 | Wesley et al. |
| 2005/0213716 | A1 | 9/2005 | Zhu et al. |
| 2006/0120373 | A1 | 6/2006 | O'Keeffe et al. |
| 2006/0120517 | A1 | 6/2006 | Moon et al. |
| 2007/0043726 | A1 | 2/2007 | Chan et al. |
| 2007/0103294 | A1 | 5/2007 | Bonecutter et al. |
| 2007/0210910 | A1 | 9/2007 | Norstrom et al. |
| 2007/0280430 | A1 | 12/2007 | He |
| 2008/0043932 | A1 | 2/2008 | Elliott et al. |
| 2008/0056244 | A1 | 3/2008 | Terpstra et al. |
| 2008/0253535 | A1 | 10/2008 | Sherry et al. |
| 2009/0054029 | A1 | 2/2009 | Hogberg et al. |
| 2009/0157419 | A1 | 6/2009 | Bursey |
| 2009/0191841 | A1 | 7/2009 | Edge et al. |
| 2009/0280770 | A1 | 11/2009 | Mahendran |
| 2009/0291663 | A1 | 11/2009 | Schultz et al. |
| 2010/0145861 | A1 | 6/2010 | Law et al. |
| 2010/0198985 | A1 | 8/2010 | Kanevsky et al. |
| 2010/0202368 | A1 | 8/2010 | Hans |
| 2010/0246780 | A1 | 9/2010 | Bakker et al. |
| 2011/0064205 | A1 | 3/2011 | Boni et al. |
| 2011/0110364 | A1 | 5/2011 | Fried et al. |
| 2011/0134897 | A1 | 6/2011 | Montemurro et al. |
| 2011/0173282 | A1 * | 7/2011 | Aaltonen ................ H04L 51/38 709/206 |
| 2011/0319049 | A1 | 12/2011 | Malosh |
| 2012/0015623 | A1 | 1/2012 | Bakker et al. |
| 2012/0166866 | A1 | 6/2012 | Rao et al. |
| 2012/0307989 | A1 * | 12/2012 | Hawley ............... H04L 65/1016 379/93.01 |
| 2012/0320912 | A1 | 12/2012 | Estrada et al. |
| 2014/0187192 | A1 | 7/2014 | Keller et al. |

OTHER PUBLICATIONS

Caddo Parish 9-1-1 web page, http://web.archive.org/web/20051229235244/http://ias.ecc.caddo911.com/ActiveEvents.asp. Dec. 2005.

Cerulean Software Upgrade Provides Public Safety Agencies with Cost Effective Wireless Data Solution, Wireless Data News, 6:16; (Aug. 5, 1998).

Department of energy improves emergency communication management with SeNTinel WebEOC from CML emergency services inc., PR Newswire (Aug. 3, 2000).

DEXA 2001, LNCS 2113, pp. 557-566 (2001).

Jackson, Donny. It's time to share, Mobile Radio Technology 23.12, p. 26 (Dec. 2005).

Lorello, Tim. Bridging the gap between first responder and citizen caller, Law Enforcement Technology 33.11, pp. 76,78-81 (Nov. 2006).

A National Assessment of Police Command, Control, and Communications Systems, U.S. Department of Justice: National Institute of Justice (Jan. 1983).

NENA-04-001 Issue 2, Recommended Generic Standards for E9-1-1 PSAP Intelligent Workstations (Aug. 23, 2000).

NENA-04-004 Original, Recommended Generic Standards for E9-1-1 PSAP Intelligent Workstations (Jun. 16, 2000).

New World Systems Help Downey, CA Police Department meet wireless E911 phase II requirements, PR Newswire Association (Jan. 13, 2004).

Nortel Networks Delivers Efficient Optical Solutions for More Effective Local Governments, Business Wire (Oct. 20, 2004).

Shenker, Scott. Fundamental Design Issues for the Future Internet, IEEE Journal on Selected Areas in Communications, 13:7 (Sep. 1995).

Vivato Announces Latest Domestic Municipal Deployment with Los Lunas, Mexico; Los Lunas Expects Savings of Nearly 80 Percent Using Vivato's Unique Two-tier Approach to Extended Range Wi-Fi, PR Newswire (Jan. 18, 2005).

White County, Tennessee Successfully Deploys Advanced E-911 Mapping and Viewing System for Emergency Response, Business Wire (Jun. 16, 2003).

International Search Report for International Application No. PCT/US2014/057015 dated Dec. 9, 2014.

"$3^{rd}$ Generation Partnership Project; Technical Specification Group Services and System Aspects; Policy and charging control architecture (Release 11)." 3GPP Standard; 3GPP TS 23.203, $3^{rd}$ Generation Partnership Project (3GPP), Mobile Competence Centre; 650; Route Des Lucioles; F-06921 Sophia-Antipolis Cedex; France; No. V11.1.0, Mar. 17, 2011, pp. 1-136.

The Avaya Aura ESRP updated brochure SVC5306. http://www.avaya.com/uk/resource/assets/brochures/Avaya%20Aura%20ESRP%20updated%20brochure%20SVC5306.pdf. Jun. 2010.

Balbas et al. "Policy and Charging Control in the Evolved Packet System." IEEE Communications Magazine, IEEE Service Center, Piscataway, US. 47(2):68-74 (2009).

Cassidian: "Aurora: Management Information System for Next Generation 911 Solutions." Retrieved from the Internet: URL:http://www.cassidian communications.com/911-call-processing/911-public-safety.php [retrieved on Sep. 14, 2012].

International Search Report for International Application No. PCT/US2012/042995 dated Jan. 23, 2013.

International Search Report for International Application No. PCT/US13/65640 dated Apr. 29, 2014.

Invitation to Pay Additional Fees for International Application No. PCT/US2012/042995 dated Sep. 26, 2012.

Mintz-Habib M. et al. "A VoIP emergency services architecture and prototype." Computer Communications and Networks. 2005. ICCCN 2005. Proceedings. $14^{th}$ International Conference. San Diego, CA, USA. Oct. 17-19, 2005. Piscataway, NJ, USA. pp. 523-528.

Natarajan S et al. "Distributed visual analytics for collaborative emergency response management." Proceedings of the $31^{st}$ Annual International Conference of the IEEE Engineering in Medicine and Biology Society: Engineering the Future of Biomedicine, EMBC 2009, Sep. 3, 2009, pp. 1714-1717.

Schulzrinne et al. The Internet Engineering Task Force RFC5012 entitled "Requirements for Emergency Context Resolution with Internet Technologies" published in Jan. 2008. http://www.ietf.org/rfc/rfc5012.txt.

* cited by examiner

MIXED MEDIA CALL ROUTING

BACKGROUND

1. Field

The present application is related to management of emergency multimedia data and, more specifically, systems, apparatus, and methods for mixed media connections.

2. Background

Emergency response systems may feature very limited capabilities. The emergency system in the U.S., for example, was designed and built several years ago. This system allowed people to place an emergency voice call over a circuit switched network. The system routed the call to an appropriate call center geographically capable of initiating a response to the emergency. To determine the geographic location of a caller, various third party systems were introduced to, for example, provide a look-up service based on the originating phone number. Similarly, an identity system was introduced to provide a number look-up service for the originating communication.

Once the information was dispatched to a call center, the capabilities of the receiving agent were limited. The circuit switched nature of the call limited the ability of an agent to transfer or conference an active call to other entities. Furthermore, transmitting data generated during the call was often decoupled from the call itself. No reliable way was available to reconstruct the events of a given call, let alone several calls related to a similar incident. Additionally, the interfaces were essentially all-or-nothing interfaces in the sense that because of the tight integration with the circuit switch voice systems, entire applications may include features that may not be applicable to all agents. This affected the installation and cost of maintaining call center systems.

To the extent call centers were integrated with other systems, the interface could be cumbersome. As previously mentioned, the user interfaces may be tightly integrated with the circuit switched voice system. Sharing data from the call center with, for example, other call centers or a centralized dispatch station could be fragmented. There also may be limited capability to receive information (e.g., feedback) for a transferred event.

Accordingly, improvements in the management of emergency response data are desirable, particularly, as emergency response systems are migrating from a circuit switched network to a packet switched network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include efficient routing of mixed media communications.

In one innovative aspect, a mixed media communications system is provided. The system includes a session manager configured to initialize a session associated with a sender device, the session including data of a first media type. The system includes a non-transitory memory including available destination information, the available destination information including one or more media types for each available destination. The system includes a router configured to determine an initial destination for the data of a first media type, the determination based on the first media type and the available destination information. The system further includes a transmission structure configured to provide the data of the first media type to the initial destination. The session manager included in the system is further configured to receive data of a second media type for the session with the sender device. Examples of the first media type and the second media type include one or more of voice, data, video, audio, text, image, and application. The router included in the system is further configured to determine a second destination for the data of the second media type, the determination based on the second media type and the available destination information. The transmission structure included in the system is configured to provide the data of the second media type to the second destination.

In some implementations of the system, a collaboration manager configured to provide communication for the session between the initial destination and the second destination may be included.

In some implementations of the system, initializing the session includes receiving via a receiving structure, an invitation message from the sender device and transmitting, via the transmission structure an invitation response message to the sender device. The invitation message may include a session initiation protocol invite message.

In some implementations, the available destination information identifies one or more of a workstation and an agent, and one or more media types which are associated therewith. Determining the initial destination and determining the second destination may include comparing the media type for the session with the one or more media types associated with the workstation or the agent for the available destinations, generating a set of candidate destinations including those available destinations matching the media type, selecting the initial destination or the second destination from the set of candidate destinations.

In some implementations, the system also includes an automated call distribution processor. In such systems, selecting the initial destination or the second destination from the set of candidate destinations includes providing the set of candidate destinations to the automated call distribution processor, and receiving the initial destination or the second destination selection.

In some implementations of the system, determining the second destination includes comparing session information for the session to stored existing session information. The determining may also include, when the session information identifies an existing session, determining whether a destination associated with the existing session is configured for the second media type. The determining may also include, when the destination associated with the existing session is configured for the second media type, selecting the destination associated with the existing session as the second destination.

The session information in one or more of the above implementations may include one or more of a session identifier, an identifier for the sender device, or an identifier for the initial destination.

In another innovative aspect, a mixed media communication method is provided. The method includes initializing, via an electronic device, a session associated with a sender device, the session including data of a first media type. The method includes determining a destination for the data of the first media type, the determination based on the first media type and available destination information. The method includes providing the data of the first media type to the determined destination. The method includes receiving data of a second media type for the session with the sender device.

Examples of the first media type and the second media type include one or more of voice, data, video, audio, text, image, and application. The method includes determining a second destination for the data of the second media type, the determination based on the second media type and the available destination information. The method includes providing the data of the second media type to the second destination.

In some implementations, the method also includes transmitting data for the session between the initial destination and the second destination.

In some implementations, initializing the session includes receiving an invitation message from the sender device, and transmitting an invitation response message to the sender device. The invitation message may include a session initiation protocol invite message.

In some implementations, the available destination information identifies one or more of a workstation and an agent, and one or more media types which are associated therewith. In such implementations, determining the initial destination and determining the second destination includes comparing the media type for the session with the one or more media types associated with the workstation or the agent for the available destinations, generating a set of candidate destinations including those available destinations matching the media type, and selecting the initial destination or the second destination from the set of candidate destinations. Determining the second destination may include comparing session information for the session to stored existing session information, and, when the session information identifies an existing session, determining whether a destination associated with the existing session is configured for the second media type, and when the destination associated with the existing session is configured for the second media type, selecting the destination associated with the existing session as the second destination.

In one or more implementations of the method, the session information comprises one or more of a session identifier, an identifier for the sender device, or an identifier for the initial destination.

In a further innovative aspect, a non-transitory computer-readable storage medium comprising instructions executable by a processor of a mixed media communications apparatus is provided. The instructions cause the apparatus to initialize a session associated with a sender device, the session including data of a first media type. The instructions further cause the apparatus to determine a destination for the data of a first media type, the determination based on the first media type and available destination information. The instructions also cause the apparatus to provide the data of the first media type to the determined destination. The instructions further cause the apparatus to receive data of a second media type for the session with the sender device. The instructions cause the apparatus to determine a second destination for the data of the second media type, the determination based on the second media type and the available destination information. The instructions cause the apparatus to provide the data of the second media type to the second destination.

DETAILED DESCRIPTION

Figure 1:
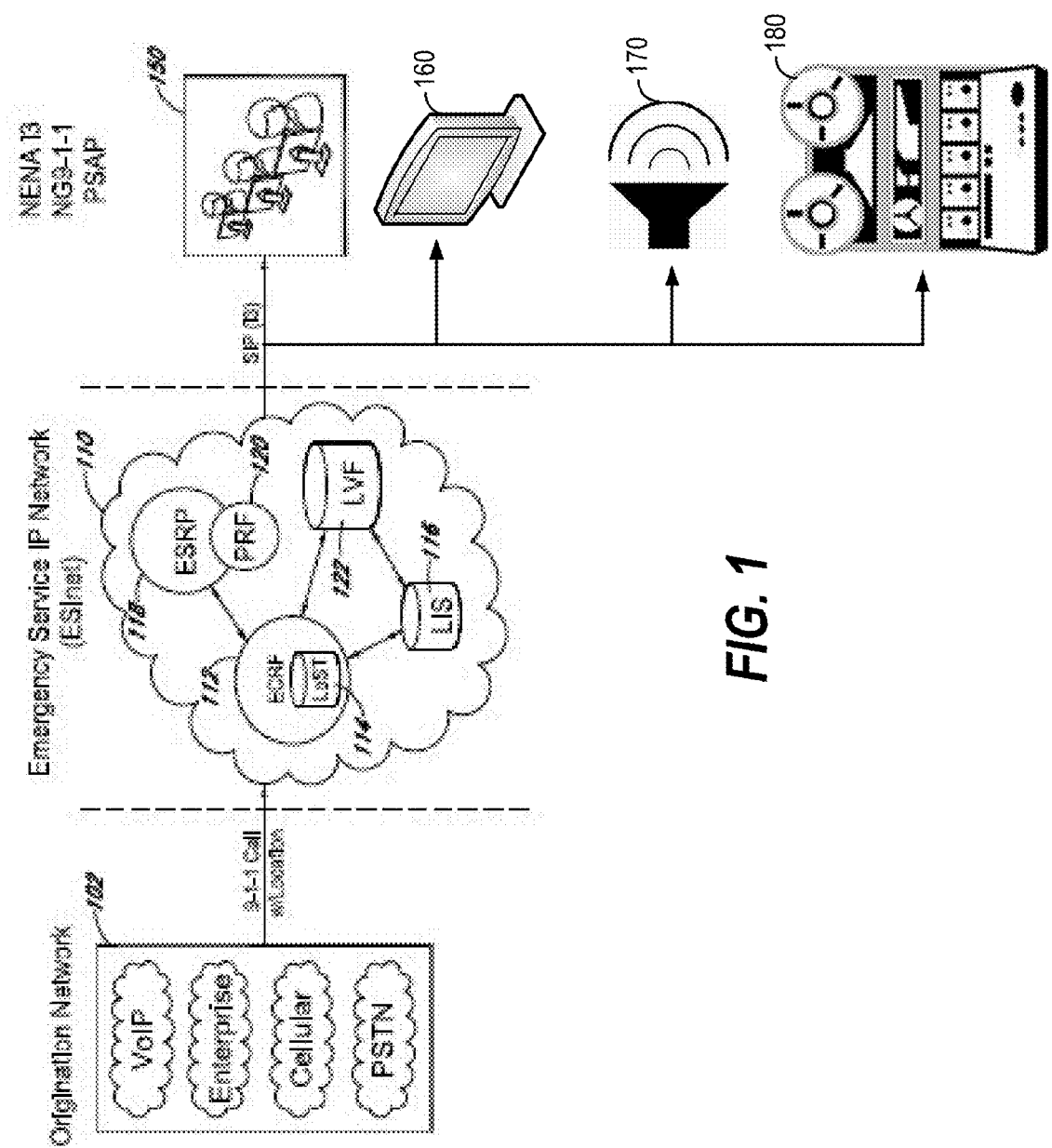
FIG. 1 is an exemplary network diagram for a packet switched multimedia capable emergency response system.

In this packet switched world discussed above, it is desirable to have a system that can efficiently accept all emergency information such as voice, text messages, video messages, streaming video, and email. As not all agents may be trained to provide emergency services based on the media type, either due to training or technical limitations of the equipment, being able to accept information presented to the system regardless of the capabilities of the current workstation/agent is also desirable. This ensures that any information provided during an emergency session is received and appropriately handled.

As emergency response communication systems migrate to new technologies, such as session initiation protocol (SIP), voice is likely to remain the primary method of communication. However, with the shift in consumer market toward smartphones and other devices with multimedia capabilities, the adoption of new media types for communications may be included in emergency response communications. Consider, for example, a user initiating a voice call to 9-1-1 and subsequently initiating a video stream on the scene of the emergency. In the emergency response market, the training and support for mixed media may not be immediate. In some instances, the capabilities to handle diverse media types may be phased in over time as equipment and training are made available.

Table 1 below shows several examples of mixed media communication scenarios. Each scenario includes a first received media type. The first received media type column provides examples of the media type first received from a source device. In some scenarios, a second communication may be received having a second media type. The second received media type column indicates a second media type received from the same source device. How the first and second media types are transmitted may vary between scenarios. The media transmission mode column indicates the way in which the first and second media types are transmitted. In switched mode, the first media type is transmitted and then the source device switches to the second media type. In parallel mode, both media types are transmitted as part of a communication. Other media types may be included such as data (e.g., binary files), audio, text, image, and application data.

TABLE 1

EXAMPLE MIXED MEDIA SCENARIOS

| First Received Media Type | Second Received Media Type | Media Transmission Mode |
| --- | --- | --- |
| Voice | None | n/a |
| Voice | Video | Switched |
| Voice | Video | Parallel |
| Video | None | n/a |
| Video | Voice | Switched |
| Voice | Real Time Text (RTT)/Message | Parallel |
| Video | RTT/Message | Parallel |

Table 1 shows several example mixed media scenarios. These are just a few illustrations of mixed media communications which may be processed by the systems and methods described. It will be understood that mixed media scenarios are not restricted to media starting with voice or video. Any media type (e.g., voice, video, text, data) may be received first or in parallel. Any type of media can initiate a call. The call initiation will generally have one or more media types associated with the call. Other media types can be added in parallel or at any time after the first media connection is established.

As part of routing calls including one or more of the media types above, the session may be routed based on the skillset of an agent or capability of a workstation at which the agent is located. The routing may consider information in the session such as the media type. The media type may be identified in the session header (e.g., SIP header). Although the discussion focuses on the media type, the described systems and methods may be applicable to route based on other session information such as sessions size, session origination, source device, and the like.

In some implementations, the call distribution system may not be able to distinguish a multimedia call from a traditional voice only call. As such, the call will be distributed using criteria associated with the current call. As a result, the receiving agent and/or workstation may not be able to support multiple media types once the call is answered.

Once the call is taken, if the caller decides to switch media modes, systems which cannot support the new media type typically reject the call as unsupported. This could result in critical information being lost.

The emergency response scenario is one example where such mixed media communication routing may be useful. Another setting where the described techniques may be applicable is call conferencing. In such applications, a call taker may be the appropriate destination for a particular media type such as a voice call. When a call is of a media type such as video, it may be more appropriate to route the call to a video projector or recorder without incurring the overhead of initiating a conference. Consider a home or office whereby a communication session may include receiving a phone call which then begins transmitting video. In such instances, it may be desirable to route the voice portion to the telephone and the video to a monitor or display device.

Described below is a session gateway/router which can support a plurality of media types in a variety of transmission modes. The session gateway/router can then select one or more terminating points for each media component of the session. In some implementations, the session gateway/router may be configured to collaborate the terminating points as part of a "media team."

Consider a call that arrives at an answering point including voice data only but switches to voice and video. The call may be initially distributed to a call taker. Upon receipt of the video data, the session gateway/router may be configured to search for a destination that supports the video portion of the call. The session gateway/router may first determine whether the voice call taker can support the video portion of the call. If the initial call taker does not support the additional media type, the session gateway/router may identify another endpoint capable of handling the new media type.

Once the destination for the new media type is identified, the data may be transmitted to the destination. In some implementations, this may include a reason code indicating the data is associated with an existing session. The reason code may cause the destination to anticipate a collaboration with the initial call taker. The session for the initial call take and the secondary destination may be a group based collaborative session. One party may drop out of the call at any time with the remaining parties engaged with the source device. It should be noted that the secondary destination need not be a destination including an agent. The secondary destination may be a device (e.g., a projector or recorder) associated with the same agent as is associated with the initial media type.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different mixed media communication technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is an exemplary network diagram for a packet switched multimedia capable emergency response system. The system includes an origination network 102. The origination network 102 is the location where the emergency multimedia data originates. The initiation of the transfer of information to the system from an origination network 102 is generally referred to as an event. Examples of origination networks 102 such as that shown in FIG. 1 include voice over IP (VoIP) networks, enterprise networks, cellular networks, or public switched telephone network (PSTN). It should be noted that events may be generated from a human user of a device capable of transmitting multimedia data (e.g., cell phone, Smartphone, person computer, tablet computer, email client) or an automated system coupled with the origination network 102. The coupling may be electronic, fiber optic, wireless or a combination thereof. In operation, an emergency call with location data is placed from the origination network 102 to an emergency service IP network (ESInet) 110.

The ESInet 110 can provide, among other functions, routing of the emergency multimedia data to an appropriate public safety answering point (PSAP) 150. For example, one ESInet 110 may be connected to multiple PSAPs. It is desirable to ensure the emergency multimedia data is handled by an appropriate PSAP 150. In one implementation, the ESInet 110 includes an emergency call routing function (ECRF) 112. The emergency call routing function includes a directory 114 of available PSAPs. The emergency call routing function 112 may be configured to determine the appropriate PSAP for incoming communications based, at least in part, on the location of the event. To determine the location, the ESInet 110 shown in the example of FIG. 1 includes a location information store (LIS) 116. The incoming event is received by the emergency service routing proxy (ESRP) 118. The ESRP 118 may be configured to query the LIS 116 for the appropriate location information associated with the event. In some implementations, the ESRP 118 and LIS 116 are coupled with a location validation function (LVF) 122. The LVF 122 can be used to ensure the location for the event is a valid location. Once the ESRP 118 has identified a valid location for the event, the ESRP 118 may be configured to query the ECRF 112 using at least the validated location to determine the appropriate PSAP 150. The ESRP 118 can then route the event to the selected PSAP 150.

Once processed by the ESInet components, the resulting session initiation protocol (SIP) message is transferred via a packet protocol (e.g., NENA I3 Standard, TCP/IP) to the packet capable public safety answering point (PSAP) 150. The SIP message or other packet transferred multimedia emergency message (e.g., via SMTP, HTTP, HTTPS) is then used by the PSAP 150 to initiate an intake and response to the communication received from the origination network 102. Only one PSAP 150 is shown in FIG. 1. In other implementations, more than one PSAP 150 may be in communication with the ESInet. Furthermore, some PSAP 150 implementations treat each event as a discrete occurrence. This may create a situation where subsequent events related to a similar incident are not necessarily identified and routed to an agent who may be most familiar with the case. Each PSAP may include one or more agents capable of responding to the emergence event. In some implementations, the agent is a human. In some implementations, the agent is an automated responder (e.g., voice recognition call service).

As shown in FIG. 1, the packet may be routed to other devices such as a monitor 160, a speaker 170, or a recorder 180. The routing may be in the alternative or in parallel. In this way, the proper equipment may be selected for presentation of the data associated with a given case. As shown, the monitor 160, the speaker 170, and the recorder 180 are separate from but coupled with the PSAP 150. In some implementations, the monitor 160, the speaker 170, and the recorder 180 may be included within the PSAP 150 such as attached to an agent's workstation.

Under this data paradigm, the number of data types that can be received at a PSAP are expanded to include more than voice. For example, an incident may begin with an emergency phone call and then may initiate a video stream. Such a call may be referred to as a mixed media call.

Mixed media calls may enable a more effective emergency response to a given situation. For instance, the mixed media may provide a richer set of information for emergency personnel to review and generate a response. However, not all emergency personnel may be trained to perform emergency response via, say, video. Similarly, not all emergency personnel may have access to technical equipment which allows the receipt, playback, etc. of video. In some systems, if the agent and/or equipment cannot handle a media type, the connection is simply refused. This may cause the loss of possibly critical information which could make a life-or-death difference.

Therefore, the mixed media information should be managed so as to ensure no connection is refused and that the appropriate agent with the proper technical equipment receives data. Accordingly, systems and methods for mixed media connections are described below.

Figure 2:
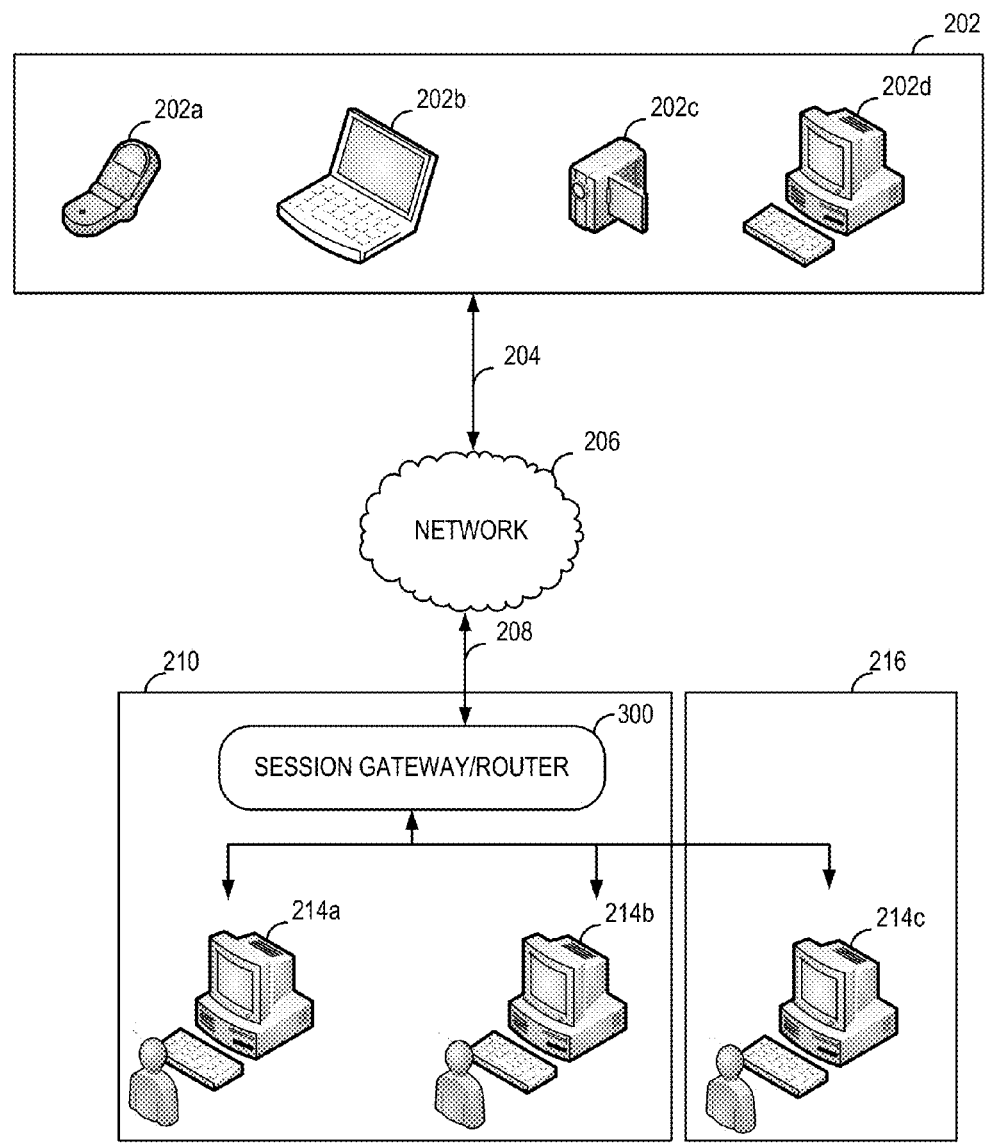
FIG. 2 shows a functional block diagram of a communication system.

FIG. 2 shows a functional block diagram of a communication system. The communication system may include one or more source devices. As shown in FIG. 2, the source devices may include, but are not limited to, a mobile phone 202a, a laptop computer 202b, a camera 202c, and a desktop computer 202d (collectively and individually referred to hereinafter as "source device 202"). The source device 202 generally includes a communication interface allowing the source device 202 to communicate via an input communication link 204 with a network 206.

The input communication link 204 may be a wired link such as an Ethernet, fiber optic, or a combination thereof. The input communication link 204 may be a wireless link such as a cellular, satellite, near field communication, or Bluetooth link. In some implementations, the input communication link 204 may include a combination of wired and wireless links.

The network 206 may be a public or private network. The network 206 may include voice over IP (VoIP) networks, enterprise networks, cellular networks, satellite networks, or public switched telephone network (PSTN). The network 206 may be a collection of networks in data communication such as a cellular network including a packet gateway to an IP-based network.

The network 206 may be configured to communicate via an answering point communication link 208 with an answering point 210. For example, the answering point 210 may be a public safety answering point (PSAP) for emergency sessions (e.g., calls). While references may be included to emergency session management, emergency sessions are used as an example of the types of sessions that may be automatically distributed in a clustered configuration consistent with the described systems and methods. Customer service sessions, sales sessions, or other communication sessions may be clustered with the described systems and methods.

The answering point communication link 208 may be a wired link such as an Ethernet, fiber optic, or a combination thereof. The answering point communication link 208 may be a wireless link such as a cellular, satellite, near field communication, or Bluetooth link. In some implementations, the answering point communication link 208 may include a combination of wired and wireless links.

The answering point 210 is configured to receive the session and route the session to an appropriate agent to handle the session. For example, if the session is an emergency service phone call, the call may be routed to an agent to obtain additional details about the emergency and/or to dispatch emergency units. To route the session, the answering point 210 may include a session gateway/router 300.

The session gateway/router 300 is configured to receive incoming session data and identify the appropriate endpoint to handle the incoming session data based on the media type associated with the session. The session gateway/router 300 may be in the network 206 or including within the answering point 210.

In some implementations, further processing of the session information may be performed to provide continuity of service. For example, if the answering point 210 receives a call-back from a device which was included in a session that was disconnected, the answering point 210 may include systems configured to associate the call-back with the previous session. Additional information on associating sessions with the appropriate endpoints may be found in commonly owned U.S. patent application Ser. No. 13/526,305 filed on Jun. 18, 2012 which is hereby incorporated in its entirety by reference. The session gateway/router 300 will be described in further detail below.

One non-limiting advantage of the session gateway/router 300 is the ability to provide a central point to accept all incoming sessions and determine the appropriate location(s) for handling the session. This allows an answering point 210 which may not have the physical equipment to handle the cornucopia of media types which exist or will be developed to accept the initial call. Furthermore, the answering point 210 may further account for training of agents and provide routing of certain media types to agents who may have specialized training in analysis of certain media types. For example, a video analyst may be better suited to receive and operate with video session information. In some implementations, it may be desirable to avoid routing certain media types to particular agents and/or workstations. For example, if a network topology makes the bandwidth to a particular workstation unreliable or otherwise limited, the workstation may be placed on an exclusion list whereby no video calls will be routed to the workstation. Similarly, if an agent excels in video or image analysis but has difficulty with audio communication, the agent may be placed on an exclusion list for audio calls.

The management of the workstation and agent information may be achieved, in one implementation, via profiles. The workstation profile may include the capability information for a workstation while an agent profile may include the capability information for an agent. The capability information includes media types the workstation/agent can and/or cannot handle. Additional information may be included in the profiles which may be used to determine where to route the session. For example, the additional information may include an identifier for the agent, an identifier for the workstation, location information for the agent and/or workstation, physical capabilities (e.g., processor, display resolution, audio equipment), supervisor information, or group association. The location information may identify a physical location such as office, desk, PSAP, server rack, or the like. The location information may indicate a network location such as an IP address, MAC address, or the like.

The answering point 210 may include one or more answering endpoints. An answering endpoint general refers to a workstation (e.g., computing device) and, in some instances, an agent operating/associated with the workstation. Some workstations may be automated response units and, as such, may not have a physical agent (e.g., a human), but rather another electronic device configured to respond to calls. In some implementations, an agent may be included in multiple endpoint definitions. For example, if an agent has a telephone and a display monitor at their desk, the agent-telephone combination may serve as one endpoint while the agent-display monitor combination may serve as a second endpoint. As shown in FIG. 2, the answering point 210 includes a first answering endpoint 214a and a second answering endpoint 214b.

The session gateway/router 300 may be configured to distribute sessions to the first answering endpoint 214 or the second answering endpoint 214b. In some implementations, the communication system may include a remote answering point 216. The remote nature of the remote answering point 216 generally refers to the configuration whereby the remote answering point 216 is not co-located with the session gateway/router 300. For example, in a packet based communication system, a session may be transferred via a packet network to a remote answering endpoint 214c in data communication with the packet network. The remote answering endpoint 214c may be physically located at site which is different than the session gateway/router 300, such as at a secondary answering point.

For example, the endpoints at the answering point 210 may not be equipped and/or trained in image response. However, the remote answering point 216 may have specialized equipment and/or agents who can effectively respond to sessions including image data. Accordingly, the session gateway/router 300 may be configured to route the session (or a portion thereof) to a remote answering point such as the remote answering point 214c.

For ease of discussion, the first answering endpoint 214a, the second answering endpoint 214b, and the remote answering endpoint 214c may collectively or individually be referred to hereinafter as "answering endpoint 214."

The answering endpoint 214 may be configured to display information about the session such as information identifying the source device 202 or a registered user of the source device 202. The answering endpoint 214 may be configured for bi-directional communication with the session gateway/router 300. For example, if the first answering endpoint 214a receives a session that the agent cannot handle, the session may be sent back to the session gateway/router 300 for re-routing to the second answering endpoint 214b or the remote answering endpoint 214c.

Figure 3:
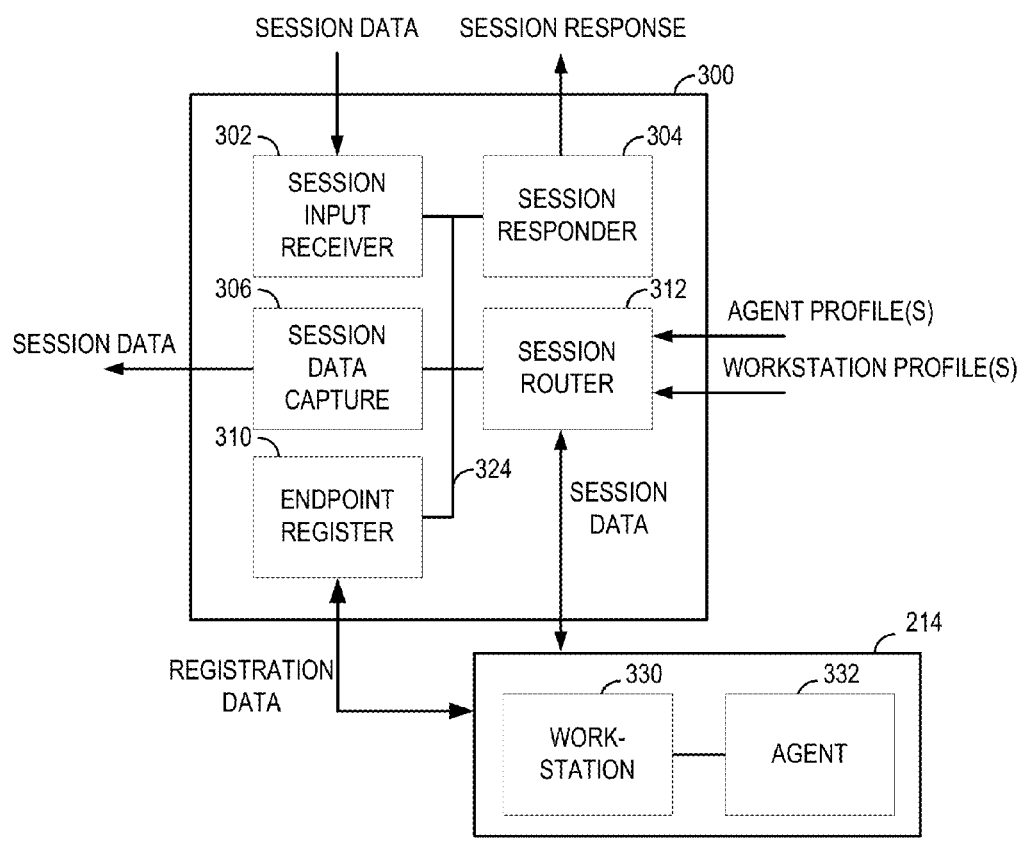
FIG. 3 shows a functional block diagram for a session gateway/router.

FIG. 3 shows a functional block diagram for a session gateway/router. The session gateway/router 300 receives, as one input, session data. The session data may include a session initiation protocol (SIP) message transmitted via a transport protocol such as HTTP, UDP, or TCP. While the discussion herein refers to SIP messages, the aspects are applicable to invitation based mixed media communications. For a given call, the first session interaction may include an invitation to start the session. The invitation in a SIP system may be a SIP INVITE message.

The session gateway/router 300 includes a session input receiver 302. The session input receiver may be configured to receive session information from a sender device. The session input receiver 302 may receive the session information via wired or wireless communication means. The session input receiver 302 may receive the session information directly from the sender device or network coupling the sender device to the session gateway/router 300. In some implementations, the session input receiver 302 is configured to obtain the session input from a memory. The session information may include header information and a data payload. The header information may identify, for example, the media type, a source device type, a source device location, and an application utilized by the source device to transmit the session information. The data payload may include the multimedia data transmitted from the source device.

The session input receiver 302 may be further configured to process the incoming session information. The processing may include parsing the session input information, storing one or more portions of the session input information, or transferring the session input information to another element included in the session gateway/router 300.

The session gateway/router 300 includes a session responder 304. The session responder 304 may obtain the received input session information. The session responder 304 may be configured to transmit a session response to the sender device. The session responder 304 may transmit the session response via wired or wireless communication means. In some implementations, the communication means utilized by the session responder 304 may be different than the communication means utilized to receive the session input.

In SIP based systems, the session response may include a session initiation protocol (SIP) provisional acknowledgment (PRACK) message, SIP acknowledgment (ACK) message, or SIP 183 progress message. The session responder 304 is configured to provide the response to the received session input prior to the assignment of an endpoint to handle the call. In such a configuration, the session can be initiated with the sender device while the answering point determines the endpoint to handle the session. In addition to allowing the answering point to accept sessions with a variety of media types, the described techniques may provide a non-limiting advantage of expedited session initiation between the sender device and the answering point. An improvement in the pace at which data can be acquired in contexts such as emergency response can make a significant difference in providing an effective emergency response.

In some implementations, if the answering point does not have the capability to service a session, the session may be declined. In declining the session, not only may valuable time be lost, but precious information may also be forfeited.

The session gateway/router 300 may include a session data capture 306. The session data capture 306 may be configured to store received session data and/or session responses. Because the session gateway/router 300 is configured to initiate sessions with sending devices providing media types which may not be supported by the endpoints at the answering point, session data may be stored for provisioning to the endpoint which can handle the call. The session data capture 306 may include a database or other structured or unstructured memory to persist the session information. The session data capture 306 may be configured to augment stored session information such as by including a timestamp, system configuration, or the like with the stored record.

The session gateway/router 300 includes an endpoint register 310. The endpoint register 310 is configured to maintain a list of endpoints which are available. As shown in FIG. 3, the endpoint 214 includes a workstation 330 and an agent 332. The endpoint 214 provides the information about the workstation 330 and the agent 332 to the endpoint register 310. The information about the workstation 330 may include an address (e.g., IP address), a workstation name, a domain, MAC address, and/or capability information (e.g., light-table, touchscreen, video-enabled, etc.). The information about agent may include a username, an agent identifier, a group to which the agent belongs (e.g., security group; specialist group; etc.), and the like. The information may be stored in a profile as discussed above. The profile may be referenced by an identifier for the workstation/agent.

As one example, the workstation 330 may be configured to register with the endpoint register 310 when the agent 332 logs into the workstation 330. In some implementations, a central security authority may be used to secure agent access to workstations. In such implementations, the central security authority may perform the registration with the endpoint register 310. The registration information about the workstation and agent may be stored or otherwise provided to another element of the session gateway/router 300

In the implementation shown in FIG. 3, the registration information may be used by a session router 312 to determine the destination for the session. The session router 312 may receive agent and/or workstation profile information along with the registration information from the endpoint register 310. Based on the media type for the session and the registered endpoints, the session router 312 is configured to identify an endpoint to handle the session.

If the session is a new session (e.g., new call/incident), the session router 312 may determine the media type for the session. Using the media type, the session router 312 may identify registered endpoints which are configured to handle calls of the determined media type. In some implementations, the session router 312 may be configured to transmit a request to an automated call distribution system to identify the appropriate endpoint. In some implementations, the session router 312 may identify a set of candidate endpoints. When the set includes more than one candidate, the session router 312 may be configured to utilize the automated call distribution system to select the destination endpoint. In some implementations, the session router 312 may be configured to select the destination endpoint from the set based on endpoint load, a routing scheme (e.g., round-robin, Monte Carlo or other statistical selection, random, etc.), or other suitable means for balancing sessions across the endpoints.

Upon selection of an endpoint, the session router 312 may transfer the session to the selected endpoint. If the endpoint is disabled, busy, or otherwise unavailable, the session router 312 may be configured to re-select an endpoint. It should be noted that in such instances, the session gateway/router 300 may have initiated the session with the sender device and session data may have been received and captured. Accordingly, a further non-limiting advantage of the described systems and methods is to allow receipt of sessions even in the face of equipment/routing failures.

When the received session data is related to a previous session, the subsequent session data may be of a different media type than the initial session data. In such implementations, the session router 312 may be further configured to consult a session information store to determine whether the session is an existing session or a new session. In the event the session is an existing session, the session router 312 may confirm the endpoint associated with the session is capable of handling the media type included in the subsequent session data. If so, the subsequent session data may be transmitted to the endpoint. Otherwise, a secondary endpoint may be identified for handling the subsequent session data. The determination may be achieved via a similar process as used to select the initial endpoint described above. In some implementations, the determination may attempt to find a secondary endpoint including the same agent as the initial endpoint. For example, if the initial endpoint is a telephone for a given agent, the telephone may not handle video data. However, the given agent may also be associated with a display monitor. This endpoint may be selected as the secondary endpoint based on the overlap in agent.

In the event the session router 312 identifies a secondary endpoint, it may be desirable for the initial endpoint and the secondary endpoint to collaborate. The session router 312 may be configured, upon identification of a secondary endpoint, to initiate a collaboration session between the initial endpoint and the secondary endpoint. A collaboration session may include providing a message to both endpoints indicating to each the endpoints included on the call. The endpoints may then be configured to communicate (e.g., chat, text message, telephone, etc.) information for the session.

In some implementations, once the session has been assigned to an endpoint, the session data may be configured to flow to the endpoint without passing through the session gateway/router 300. For example, in SIP based systems, the endpoint may transmit subsequent SIP messages to the sender device identifying the endpoint that is handling the session.

A bus 324 may be included to couple the elements of the session gateway/router 300. The bus 324 may be a data bus, communication bus, or other bus mechanism to enable the various components of the session gateway/router 300 to exchange information. It will further be appreciated that while different elements have been shown, multiple elements may be combined into a single element, such as the session input receiver 302 and the session responder 304.

Figure 4:
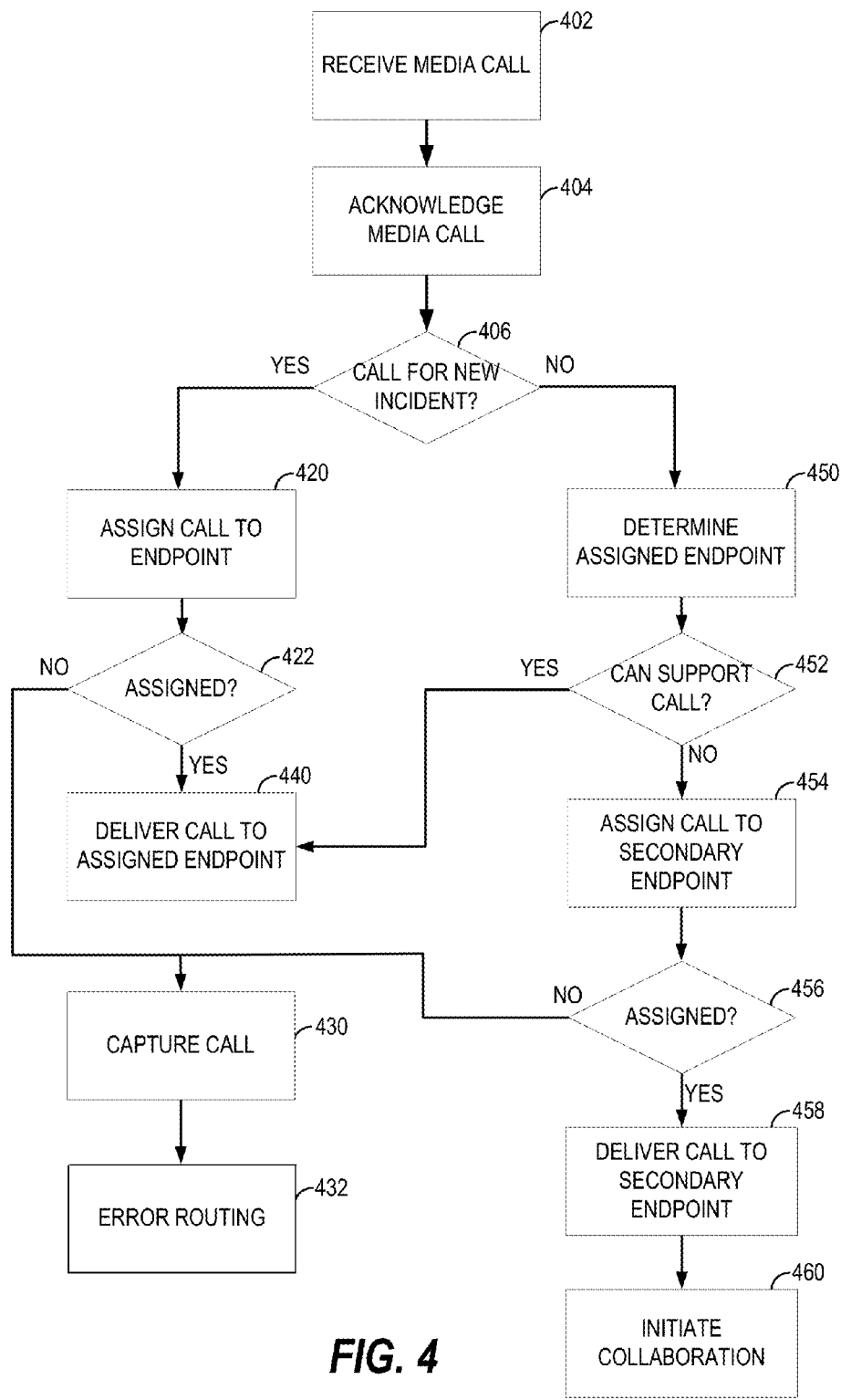
FIG. 4 shows a process flow diagram for a method of receiving media calls.

FIG. 4 shows a process flow diagram for a method of receiving media calls. The process shown in FIG. 4 may be implemented in whole or in part by an electronic device such as the session gateway/router 300 described above.

At node 402, a media call is received from a sender device. The media call may be received by an answering point. Within the answering point the session gateway/router 300 may obtain the call. Receiving the media call may include receiving a call via one or more wired or wireless communication networks. In SIP systems, the received media call may include a SIP INVITE message for a new call.

At node 404, the media call is acknowledged. In SIP systems, the acknowledgment may include transmitting a SIP INVITE response.

At node 406, a determination is made as to whether the call is a new call or is for an existing incident. The determination may be based on a comparison of information included in the media call (e.g., sender device identifier, session identifier) and stored session information.

If it is determined that the call is related to a new incident, at node 420, the call is assigned to an endpoint. The assignment to an endpoint is based on the media type for the call. The call media type may be identified based on a header field included in the media type. The call media type may be identified based on information included in the body data of the call.

At node 422, a determination is made as to whether the call has been successfully assigned. The assignment may fail because no endpoint is identified. The assignment may fail because the identified endpoint is unavailable.

In the case where the call has not been assigned, at node 430, the call is captured. Capturing the call includes capturing the information about the call and as well as data transmitted for the call. The captured information may be stored, for example, in a database or other persistent memory. In some implementations, the process may return to node 420 to assign the call to another endpoint.

At node 432, error routing is performed. The error routing may include transmitting an error message to an endpoint. The message may include the session data, an error message, or other information related to the call. The error routing may be automated. In some implementations, the error routing may include automated call distribution without regard to media type. Error routing may further include logging an error message for the failed routing attempt. This may be used to refine profiles and/or routing preferences for the session gateway/router 300.

Returning to node 422, if the call has been successfully assigned, at node 440, the call is delivered to the assigned endpoint. The delivery may include transferring the call data to the workstation associated with the identified endpoint. The delivery allows the sender device to provide the call data of the identified media type to the identified endpoint. Accordingly, the appropriate endpoint for the media type is able to receive and respond to the media type transmitted by the sender device.

Returning to node 406, if the call is not for a new incident, at node 450, the assigned endpoint for the existing incident is identified. The identification may include comparing call session information to stored session information.

At node 452, a determination is made as to whether the endpoint assigned to the session can support the media type associated with the received call session information. If the current endpoint can support the media type, the process continues to node 440 as described above. The determination may be based on a comparison of the agent and/or workstation profile associated with the initial endpoint assigned to the session with the media type for the newly received media type.

If the determination at node 452 finds the currently assigned endpoint cannot support the media type associated with the received call session information, at node 454, a secondary endpoint is assigned to handle the new media type. The assignment at node 454 may be similar to the assignment process discussed with reference to node 420.

At node 456, a determination is made as to whether the call has been successfully assigned to the identified secondary endpoint. The assignment may fail because no secondary endpoint is identified. The assignment may fail because the identified secondary endpoint is unavailable. The process shown in FIG. 4 continues to node 430 as described above. In some implementations, the process may return to node 454 to select another secondary endpoint.

Returning to node 456, if the call has been successfully assigned to the secondary endpoint, at node 458, the call data of the new media type is delivered to the secondary endpoint. The delivery may include transferring the call data to the workstation associated with the identified secondary endpoint. The delivery allows the sender device to provide the initial call data of a first media type to the initially identified endpoint and subsequent call data of a second media type to the secondary endpoint. Accordingly, the appropriate endpoints for the media types are able to receive and respond to the media type transmitted by the sender device.

In some implementations, at node 460, a collaboration session may be established between the initial endpoint and the secondary endpoint. The collaboration session may include providing a message to both endpoints indicating to each the endpoints included on the call. The endpoints may then be configured to communicate (e.g., chat, text message, telephone, etc.) information for the session.

It will be appreciated that the process shown in FIG. 4 may be repeated with further media types. For such calls, each new media type may cause the selection and routing to the endpoint configured to receive the media type.

Figure 5:
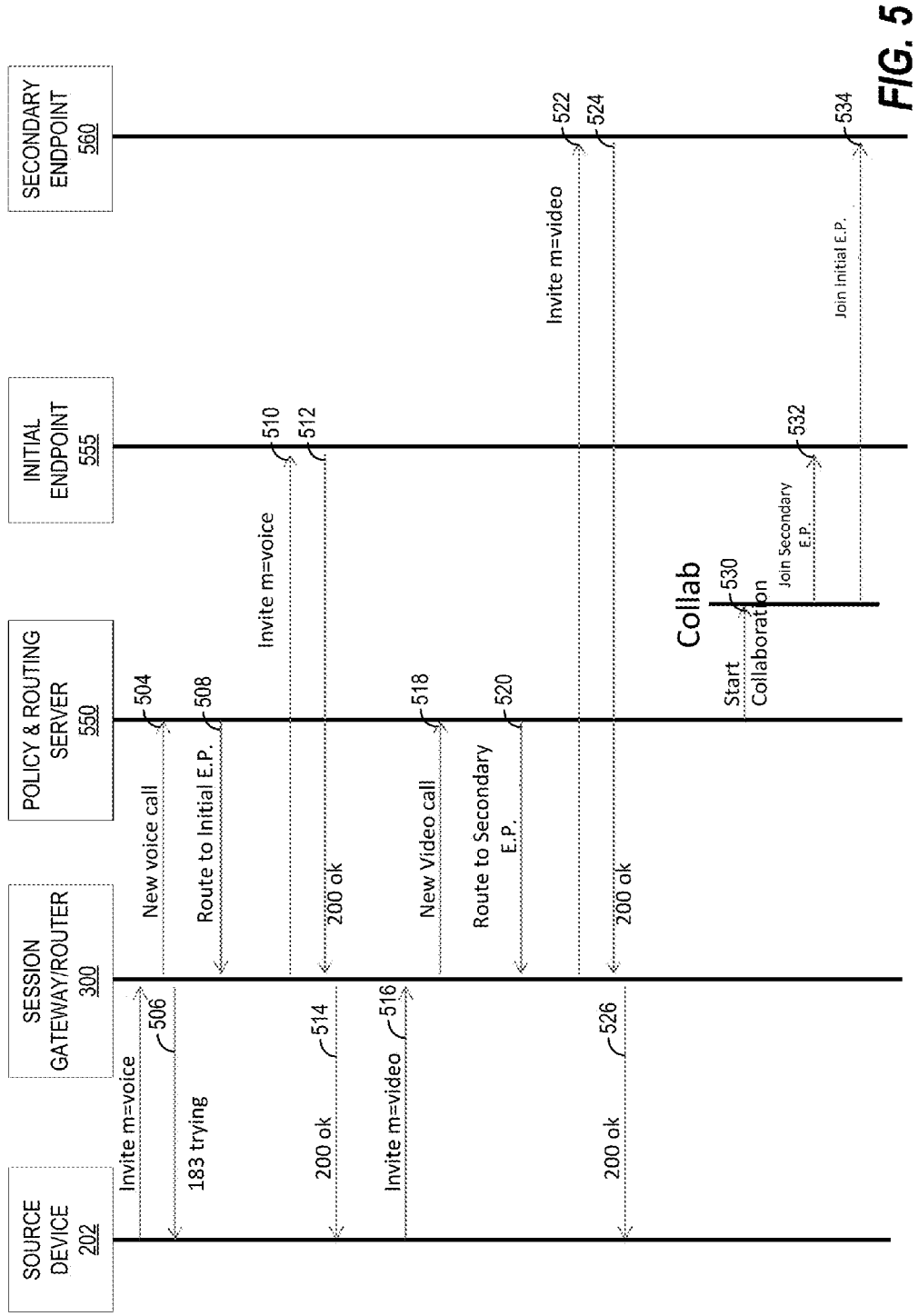
FIG. 5 shows a message flow diagram for a method of receiving media calls.

FIG. 5 shows a message flow diagram for a method of receiving media calls. The message flow of FIG. 5 shows messages exchanged between several entities which may be included in a communication system. For ease of explanation, the number of entities shown has been limited. However, it will be understood that additional entities may be added or multiple entities combined consistent with the description herein.

The message flow begins with the source device 202 transmitting a call invitation 502 to the session gateway/router 300. As shown in FIG. 5, the call invitation 502 is a SIP INVITE with the media type of voice.

The session gateway/router 300 shown in FIG. 5 is configured to consult a policy and routing server 550 to identify the appropriate endpoint for the call. The consultation includes a message 504 transmitted from the session gateway/router 300 to the policy and routing server 550. The message 504 includes the media type for the call which will be used by the policy and routing server 550 to identify the endpoint to handle the call.

After sending the message 504, the session gateway/router 300 transmits a message to the source device 202 indicating the call is being set up. As shown in the SIP implementation of FIG. 5, the message 506 comprises a SIP 183 trying message. It should be noted that this set up indication may be transmitted prior to identifying the endpoint to handle the call.

A message 508 is received by the session gateway/router 300 from the policy and routing server 550 indicating the endpoint to handle the call received from the source device 202. The message 508 may include an identifier of an endpoint resulting from the process shown in FIG. 4.

The session gateway/router 300 may transmit a message 510 to an initial endpoint 555. As shown in FIG. 5, the message 510 is a SIP INVITE message with a media type of voice. The initial endpoint 555 may be configured to transmit a response message 512 to the session gateway/router 300. The response message 512 can include a value indicating the initial endpoint 555 is available to begin a session for the identified media type. As shown, the response message 512 is a 200 "ok" response message.

In some implementations, the response message 512 may include a value indicating the initial endpoint 555 cannot handle the new session. In such instances, the session gateway/router 300 may be configured to again consult with the policy and routing server 550 to identify a new initial endpoint for the call.

Once the session gateway/router 300 receives the "ok" response, an endpoint has been successfully assigned the call. The response message 512 may be used to generate a response message 514 for transmission from the session gateway/router 300 to the source device 202. The response message 514 may be identical to the response message 512. In some implementations, the response message 514 is based on the response message 512.

At this point, the source device 202 has been paired with the initial endpoint 555. The initial endpoint 555 may begin receiving from and transmitting data to the source device 202. Not shown in FIG. 5 is the exchange of voice data between the source device 202 and the initial endpoint 555.

Subsequently, the source device 202 may attempt to transmit video data. The transmission may include another invite message 516 including a new media type. In this example, the new media type is video.

The session gateway/router 300 shown in FIG. 5 is configured to again consult the policy and routing server 550 to identify the appropriate endpoint for the call data of the new media type. The consultation includes a message 518 transmitted from the session gateway/router 300 to the policy and routing server 550. The message 518 includes the media type for the call which will be used by the policy and routing server 550 to identify the endpoint to handle the call. The message 518 may also include a session identifier to indicate the data is related to an existing session.

A message 520 is received by the session gateway/router 300 from the policy and routing server 550 indicating the secondary endpoint to handle the call data of the new media type received from the source device 202. The message 520 may include an identifier of a secondary endpoint resulting from the process shown in FIG. 4.

The session gateway/router 300 may transmit a message 522 to a secondary endpoint 560. As shown in FIG. 5, the message 522 is a SIP INVITE message with a media type of video. The secondary endpoint 560 may be configured to transmit a response message 524 to the session gateway/router 300. The response message 524 can include a value indicating the secondary endpoint 560 is available to begin a session for the identified media type. As shown, the response message 524 is a 200 "ok" response message.

Once the session gateway/router 300 receives the "ok" response message 524, a secondary endpoint has been successfully assigned the call data of the new media type. The response message 524 may be used to generate a response message 526 for transmission from the session gateway/router 300 to the source device 202. The response message 526 may be identical to the response message 524. In some implementations, the response message 526 is based on the response message 524.

At this point, the source device 202 has been paired with the secondary endpoint 560 for the video portion of the call. The secondary endpoint 560 may begin receiving from and transmitting data to the source device 202. Not shown is the exchange of video data between the source device 202 and the secondary endpoint 560. In some implementations, the source device 202 may transmit voice data to the initial endpoint 555 and video data to the secondary endpoint 560. It should be appreciated that from the source device 202 perspective, the transition to include video data is transparent. That is, a new call was not needed to cause the routing of the new media type and the system was configured to accept the new video call even though the initial endpoint 555 was not configured to handle video data.

As shown in FIG. 5, a message 530 may be transmitted to cause the initialization of a collaboration session between the initial endpoint 555 and the secondary endpoint 560. The message 530 may identify the two data streams and the corresponding endpoints assigned to the data streams. Based on this information, a third collaboration stream may be created between the initial endpoint 555 and the secondary endpoint 560. For example, messages 532 and 534 may be transmitted to the initial endpoint 555 and the secondary endpoint 560, respectively, to join the collaboration stream for the call.

While FIG. 5 shows the session gateway/router 300 as a separate entity from the policy and routing server 550, in some implementations, the session gateway/router 300 may include the policy and routing server 500 functionality such as via the session router 312 shown in FIG. 3. In some implementations, the session router 312 is configured to communicate with the policy and routing server 550 which may sometimes be referred to as an automated call distribution system.

Figure 6:
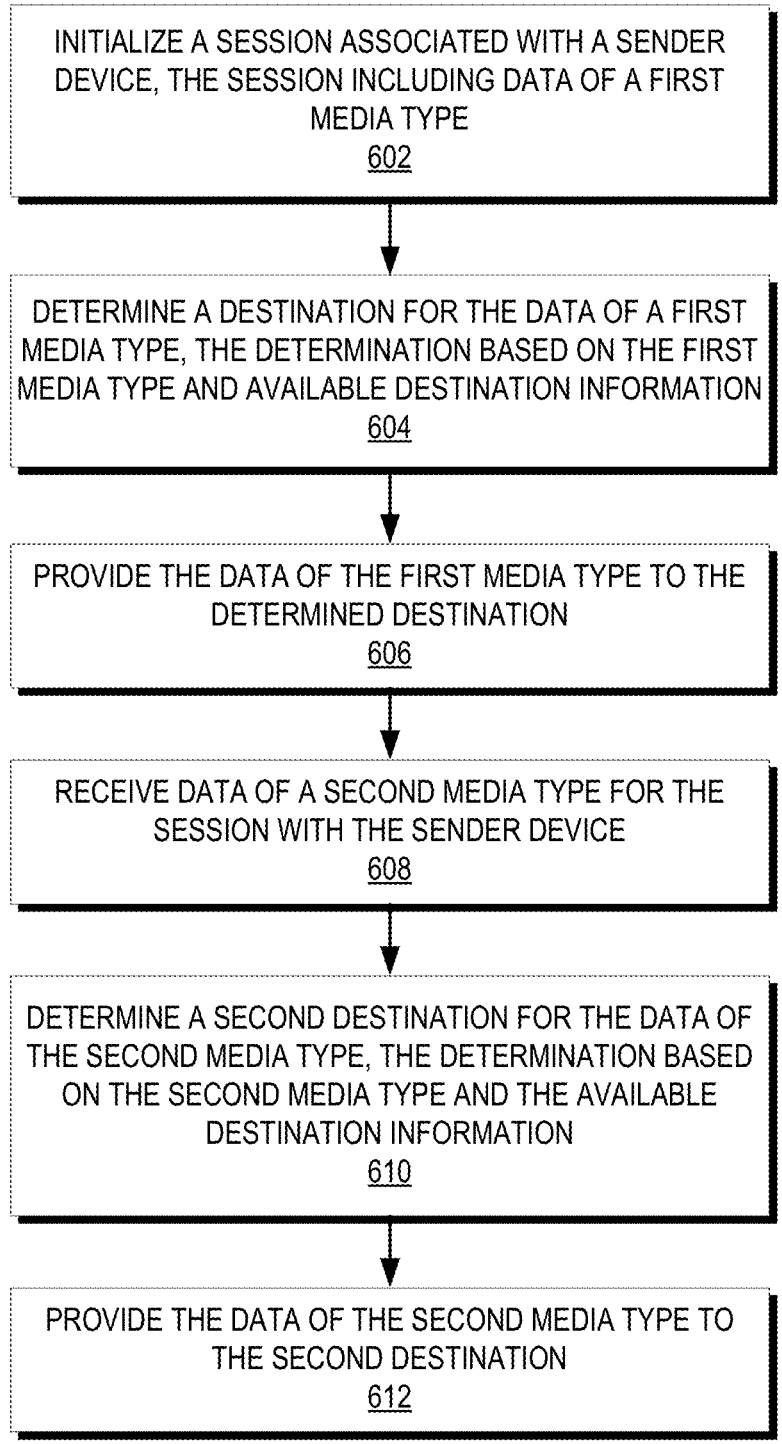
FIG. 6 shows a process flow diagram for a method of mixed media communication.

FIG. 6 shows a process flow diagram for a method of mixed media communication. The method shown may be implemented in whole or in part by one or more of the devices described above such as the session gateway/router 300.

At node 602, a session is initialized with a sender device, the session including data of a first media type. At node 604, a destination for the data of a first media type is determined based on the first media type and available destination information. At node 606, the data of the first media type is provided to the determined destination. At node 608, data of a second media type is received for the session with the sender device. At node 610, a second destination for the data of the second media type is determined based on the second media type and the available destination information. At node 612, the data of the second media type is provided to the second destination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with an electronic device, a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web-site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device or component included therein as applicable. For example, such a device can be coupled to a server to facilitate the transfer of means for performing the methods described herein. Alternatively, various methods described herein can be provided via storage means (e.g., RAM, ROM, a physical storage medium such as a compact disc, or floppy disk, etc.), such that a device or component included therein can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the disclosure.

While the foregoing is directed to aspects of the present disclosure, other and further aspects of the disclosure may be devised without departing from the basic scope thereof.

What is claimed is:

1. A mixed media communications system, the system comprising:
    a session manager configured to initialize a session associated with a sender device, the session including data of a first media type, the data of the first media type including emergency information;
    a non-transitory memory including available destination information for a plurality of available destinations, the available destination information indicating media types processed by each of the plurality of available destinations;
    a router configured to determine an initial destination from the plurality of available destinations for the data of the first media type, the determination based on the first media type and the available destination information; and
    a transmission structure configured to provide the data of the first media type to the determined initial destination,
    wherein the session manager is further configured to receive data of a second media type for the session with the sender device,
    wherein the router is further configured to determine a second destination from the plurality of available destinations for the data of the second media type, the determination based on the second media type and the available destination information, and
    wherein the transmission structure is configured to provide the data of the second media type to the second destination.

2. The system of claim 1, further comprising a collaboration manager configured to provide communication for the session between the initial destination and the second destination.

3. The system of claim 1, wherein the first media type and the second media type comprise one or more of voice, data, video, audio, text, image, and application.

4. The system of claim 1, wherein initializing the session includes:
receiving via a receiving structure, an invitation message from the sender device; and
transmitting, via the transmission structure an invitation response message to the sender device.

5. The system of claim 4, wherein the invitation message comprises a session initiation protocol invite message.

6. The system of claim 1, wherein the available destination information identifies one or more of a workstation and an agent, and one or more media types which are associated therewith.

7. The system of claim 6, wherein determining the initial destination and determining the second destination comprises:
comparing the media type for the session with the one or more media types associated with the workstation or the agent for the plurality of available destinations;
generating a set of candidate destinations including those available destinations matching the media type; and
selecting the initial destination or the second destination from the set of candidate destinations.

8. The system of claim 7, further comprising an automated call distribution processor,
wherein selecting the initial destination or the second destination from the set of candidate destinations comprises:
providing the set of candidate destinations to the automated call distribution processor; and
receiving the initial destination or the second destination selection.

9. The system of claim 7, wherein determining the second destination comprises:
comparing session information for the session to stored existing session information;
when the session information identifies an existing session, determining whether a destination associated with the existing session is configured for the second media type; and
when the destination associated with the existing session is configured for the second media type, selecting the destination associated with the existing session as the second destination.

10. The system of claim 9, wherein the session information comprises one or more of a session identifier, an identifier for the sender device, or an identifier for the initial destination.

11. A mixed media communication method comprising:
initializing, via an electronic device, a session associated with a sender device, the session including data of a first media type, the data of the first media type including emergency information;
determining a destination for the data of the first media type, the determination based on the first media type and available destination information for a plurality of available destinations, the available destination information indicating media types processed by each of the plurality of available destinations;
providing the data of the first media type to the determined destination;
receiving data of a second media type for the session with the sender device;
determining a second destination from the plurality of available destinations for the data of the second media type, the determination based on the second media type and the available destination information; and
providing the data of the second media type to the second destination.

12. The method of claim 11, further comprising transmitting data for the session between the initial destination and the second destination.

13. The method of claim 11, wherein the first media type and the second media type comprise one or more of voice, data, video, audio, text, image, and application.

14. The method of claim 11, wherein initializing the session includes:
receiving an invitation message from the sender device; and
transmitting an invitation response message to the sender device.

15. The method of claim 14, wherein the invitation message comprises a session initiation protocol invite message.

16. The method of claim 11, wherein the available destination information identifies one or more of a workstation and an agent, and one or more media types which are associated therewith.

17. The method of claim 16, wherein determining the initial destination and determining the second destination comprises:
comparing the media type for the session with the one or more media types associated with the workstation or the agent for the plurality of available destinations;
generating a set of candidate destinations including those available destinations matching the media type; and
selecting the initial destination or the second destination from the set of candidate destinations.

18. The method of claim 17, wherein determining the second destination comprises:
comparing session information for the session to stored existing session information;
when the session information identifies an existing session, determining whether a destination associated with the existing session is configured for the second media type; and
when the destination associated with the existing session is configured for the second media type, selecting the destination associated with the existing session as the second destination.

19. The method of claim 18, wherein the session information comprises one or more of a session identifier, an identifier for the sender device, or an identifier for the initial destination.

20. A non-transitory computer-readable storage medium comprising instructions executable by a processor of a mixed media communications apparatus, the instructions causing the apparatus to:
initialize a session associated with a sender device, the session including data of a first media type, the data of the first media type including emergency information;
determine a destination for the data of the first media type, the determination based on the first media type and available destination information for a plurality of available destinations, the available destination information indicating media types processed by each of the plurality of available destinations;
provide the data of the first media type to the determined destination;
receive data of a second media type for the session with the sender device;
determine a second destination from the plurality of available destinations for the data of the second media type, the determination based on the second media type and the available destination information; and provide the data of the second media type to the second destination.

* * * * *